(12) United States Patent
Xue

(10) Patent No.: US 12,200,456 B2
(45) Date of Patent: Jan. 14, 2025

(54) EARPHONE UPGRADE METHOD, EARPHONE ASSEMBLY, UPGRADE DEVICE AND NON-TRANSITORY COMPUTER READABLE STORAGE MEDIUM

(71) Applicant: GOERTEK INC., Weifang (CN)

(72) Inventor: Junxiao Xue, Weifang (CN)

(73) Assignee: GOERTEK INC., Weifang (CN)

( * ) Notice: Subject to any disclaimer, the term of this patent is extended or adjusted under 35 U.S.C. 154(b) by 346 days.

(21) Appl. No.: 17/646,577

(22) Filed: Dec. 30, 2021

(65) Prior Publication Data

US 2022/0124435 A1 Apr. 21, 2022

Related U.S. Application Data

(63) Continuation of application No. PCT/CN2019/129567, filed on Dec. 28, 2019.

(30) Foreign Application Priority Data

Nov. 22, 2019 (CN) .......................... 201911159533.3

(51) Int. Cl.
*H04R 5/033* (2006.01)
*G06F 8/65* (2018.01)
(Continued)

(52) U.S. Cl.
CPC ............... *H04R 5/033* (2013.01); *G06F 8/65* (2013.01); *G06F 9/52* (2013.01); *G06F 9/542* (2013.01);
(Continued)

(58) Field of Classification Search
CPC ...... H04R 5/033; H04R 5/04; H04R 2420/07; H04R 1/1041; G06F 8/65; G06F 9/52; G06F 9/542; H04W 4/80
(Continued)

(56) References Cited

U.S. PATENT DOCUMENTS

| 10,412,567 B1 | 9/2019 | Tong et al. |
| 2008/0147439 A1 | 6/2008 | Maliszewski |

(Continued)

FOREIGN PATENT DOCUMENTS

| CN | 103810004 A | 5/2014 |
| CN | 106791123 A | 5/2017 |

(Continued)

OTHER PUBLICATIONS

First Office Action issued in corresponding Chinese Application No. 201911159533.3; mailed Jan. 13, 2021; 27 pgs.

(Continued)

*Primary Examiner* — Eugene Yun

(74) *Attorney, Agent, or Firm* — HAUPTMAN HAM, LLP

(57) ABSTRACT

This application discloses an earphone upgrade method, which includes following steps: acquiring first address information of a first earphone, acquiring second address information of a second earphone through the first earphone; sending a first upgrade packet to the first earphone based on the first address information to upgrade the first earphone, meanwhile, sending a second upgrade packet to the second earphone based on the second address information to upgrade the second earphone. The present application further discloses an upgrade device, an earphone assembly and a non-transitory computer readable storage medium. The present application aims to improve upgrade efficiency of earphones.

7 Claims, 3 Drawing Sheets

(51) Int. Cl.
  *G06F 9/52* (2006.01)
  *G06F 9/54* (2006.01)
  *H04R 5/04* (2006.01)
  *H04W 4/80* (2018.01)
(52) U.S. Cl.
  CPC .............. *H04R 5/04* (2013.01); *H04W 4/80* (2018.02); *H04R 2420/07* (2013.01)
(58) Field of Classification Search
  USPC ........................................ 455/41.2
  See application file for complete search history.

(56) References Cited

U.S. PATENT DOCUMENTS

| | | | |
|---|---|---|---|
| 2014/0068592 A1 | 3/2014 | Chitre et al. | |
| 2017/0269965 A1 | 9/2017 | Son et al. | |
| 2018/0359348 A1* | 12/2018 | Katkam | G06F 3/165 |
| 2022/0039179 A1* | 2/2022 | Chen | H04R 1/1016 |

FOREIGN PATENT DOCUMENTS

| | | |
|---|---|---|
| CN | 107145330 A | 9/2017 |
| CN | 107239302 A | 10/2017 |
| CN | 107894881 A | 4/2018 |
| CN | 108449746 A | 8/2018 |
| CN | 108600892 A | 9/2018 |
| CN | 108769972 A | 11/2018 |
| CN | 108810698 A | 11/2018 |
| CN | 108874421 A | 11/2018 |
| CN | 108882211 A | 11/2018 |
| CN | 109068211 A | 12/2018 |
| CN | 109445806 A | 3/2019 |
| CN | 109491691 A | 3/2019 |

OTHER PUBLICATIONS

Second Office Action issued in corresponding Chinese Application No. 201911159533.3; mailed Jul. 28, 2021; 25 pgs.

Notification to Grant issued in corresponding Chinese Application No. 201911159533.3; mailed Nov. 16, 2021; 7 pgs.

International Search Report and Written Opinion issued in corresponding International Application No. PCT/CN2019/129567; mailed Aug. 24, 2020; 11 pgs.

* cited by examiner

EARPHONE UPGRADE METHOD, EARPHONE ASSEMBLY, UPGRADE DEVICE AND NON-TRANSITORY COMPUTER READABLE STORAGE MEDIUM

CROSS REFERENCES TO RELATED APPLICATIONS

The present disclosure is a continuation application of International Application No. PCT/CN2019/129567, filed on Dec. 28, 2019, entitled "EARPHONE UPGRADE METHOD, EARPHONE ASSEMBLY, UPGRADE DEVICE AND READABLE STORAGE MEDIUM" which claims the priority of Chinese application No. 201911159533.3, filed on Nov. 22, 2019. The disclosures of the aforementioned applications are hereby incorporated by reference in their entireties.

FIELD

The present application is related to a technical field of listening equipments, in particular to an earphone upgrade method, an earphone assembly, an upgrade device and a non-transitory readable storage medium.

BACKGROUND

Earphones may be divided into wired earphones and wireless earphones. With the progress of technology, at present the true wireless stereo earphones (TWS earphones) are brought into being, which consists of a left earphone and a right earphone that do not need wired connection between each other, but are wirelessly connected by Bluetooth or other means. Hardware structures of the left earphone and the right earphone are the same, and any one of the earphones may be connected with a terminal as a main earphone, however only one earphone is connected with the terminal at a time.

At present, there are usually two ways to upgrade the two earphones of wireless earphones like TWS earphones. One is to connect the two earphones as a main earphone to a mobile phone one after another, and the mobile phone successively upgrades the connected main earphones, to realize the upgrade of the two earphones, but this will lead to a long upgrade time. The other one is to send an upgrade package to the main earphone connected to the mobile phone through the mobile phone, and then the main earphone sends the upgrade package to the secondary earphone. The two earphones cannot receive the upgrade package at the same time, which also leads to a long upgrade time. It may be seen that the current earphone upgrade is inefficient.

The above content is only used for understanding a technical scheme of the present application, and does not mean that the above content is recognized as the prior art.

SUMMARY

The main purpose of the present application is to provide an earphone upgrade method, aiming at improving upgrading efficiency of a pair of earphones.

In order to achieve the above purpose, an earphone upgrade method is provided including following steps:

acquiring first address information of a first earphone, and acquiring second address information of a second earphone through the first earphone; and sending a first upgrade packet to the first earphone based on the first address information to upgrade the first earphone, and meanwhile, sending a second upgrade packet to the second earphone based on the second address information to upgrade the second earphone.

Optionally, the step of acquiring second address information of a second earphone through the first earphone includes:

acquiring broadcast information of the first earphone; and
analyzing the broadcast information to acquire the second address information.

Optionally, the second address information is synchronized by the second earphone to the first earphone.

Optionally, the step of sending a first upgrade packet to the first earphone based on the first address information to upgrade the first earphone includes:

invoking a first preset communication interface of the first earphone based on the first address information;

creating a first data transmission channel based on the first preset communication interface; and sending the first upgrade package to the first earphone through the first data transmission channel, thereby, upgrading the first earphone with the first upgrade package.

Optionally, the step of sending a second upgrade packet to the second earphone based on the second address information to upgrade the second earphone includes:

invoking a second preset communication interface of the second earphone based on the second address information;

creating a second data transmission channel based on the second preset communication interface; and sending the second upgrade package to the second earphone through the second data transmission channel, thereby, upgrading the second earphone with the second upgrade package.

Optionally, after the step of sending a first upgrade packet to the first earphone based on the first address information to upgrade the first earphone, and meanwhile, sending a second upgrade packet to the second earphone based on the second address information to upgrade the second earphone, the earphone upgrade method further includes:

acquiring a program version of an earphone connected with the upgrade device, in a determination that any one of the first earphone and the second earphone is connected with the upgrade device;

determining whether the first earphone and the second earphone are upgraded successfully according to the program version; and determining that the first earphone and the second earphone are upgraded successfully, in a determination that the program version is a preset version; or determining that an upgrade of the first earphone and the second earphone is failed, in a determination that the program version is a version other than the preset version.

In addition, in order to achieve the above purpose, the present application further proposes an upgrade device including a memory, a processor, and an earphone upgrade program stored on the memory and operable on the processor. In a determination that the earphone upgrade program is executed by the processor, steps of the earphone upgrade method described in any one of the embodiments above are realized.

In addition, in order to achieve the above purpose, the present application further provides an earphone upgrade method including:

defining an earphone paired with a preset earphone as a third earphone, when the preset earphone is in a paired state;

determining whether the preset earphone is an earphone connecting with the upgrade device;

acquiring the third address information of the third earphone, in a determination that the preset earphone is an earphone connecting with the upgrade device;

adding the third address information to broadcast information of the preset earphone; and controlling the preset earphone to output the broadcast information thereby the upgrade device acquires the third address information, and sends a third upgrade packet to the third earphone based on the third address information to upgrade the third earphone.

Optionally, after the step of determining whether the preset earphone is an earphone connecting with the upgrade device, the earphone upgrade method further includes:

acquiring fourth address information of the preset earphone, in a determination that the preset earphone is not an earphone connecting with the upgrade device; and controlling the preset earphone to synchronize the fourth address information to the third earphone, thereby the upgrade device acquires the fourth address information based on the third earphone, and sends a fourth upgrade packet to the preset earphone based on the fourth address information to upgrade the preset earphone.

Optionally, after the step of sending a fourth upgrade packet to the preset earphone based on the fourth address information to upgrade the preset earphone, the earphone upgrade method further includes:

controlling the earphone currently connecting with the upgrade device to disconnect the communication connection with the upgrade device, after upgrading the preset earphone and the third earphone;

controlling the preset earphone and the third earphone to restart;

controlling the preset earphone or the third earphone to connect with the upgrade device, thereby the upgrade device acquires a program version of the preset earphone or the third earphone which is connected with the preset earphone, and determining whether the preset earphone and the third earphone are upgraded successfully based on the program version.

In addition, in order to achieve the above purpose, the present application further provides an upgrade device comprising a memory, a processor, and an earphone upgrade program stored on the memory and operable on the processor, wherein, when the earphone upgrade program is executed by the processor, the steps of upgrading an earphone described in the embodiments above are realized.

In addition, in order to achieve the above purpose, the present application further provides an earphone assembly including at least two earphones connected in wireless communication, each of the earphones includes a memory, a processor, and an earphone upgrade program stored on the memory and operable on the processor. when the earphone upgrade program is executed by the processor, the steps of the earphone upgrade method described in the embodiments above are realized.

In addition, to achieve the purpose above, the present application further provides a non-transitory computer readable storage medium, an earphone upgrade program is stored on the non-transitory computer readable storage medium, and the steps of the earphone upgrade program according to any one of the embodiments above are executed when the earphone upgrade program is executed by a processor.

The present application provides an earphone upgrade method, the method includes: acquiring a first address information of a first earphone, and acquiring address information of a second earphone through the first earphone, then, the first earphone and the second earphone are upgraded simultaneously based on the address information of the two earphones in a wireless communication environment. In this way, in a determination that the first earphone acquires a first upgrade package to upgrade, the first earphone may be connected with the second earphone based on the second address information and send a second upgrade package to upgrade the second earphone, therefore the first earphone and the second earphone may be upgraded synchronously, and time required is shorter than a current mode of successively upgrading two earphones, therefor improving earphone upgrade efficiency.

BRIEF DESCRIPTION OF THE DRAWINGS

In order to more clearly explain the embodiments of the present application or the technical solution in the related art, the drawings required for a description of the embodiments or related art will be briefly described below. It is apparent that the drawings described below are only a part of the drawings of the present application, and other drawings may be acquired from the drawings provided without creative effort by those of ordinary skills in the art.

DETAILED DESCRIPTION OF THE EMBODIMENTS

The technical proposal in embodiments of the present application will be described below in conjunction with drawings in the embodiments of the present application, and it is obvious that the described embodiments are only a part of the embodiments of the present application, not all of them. Based on the embodiments in the present application, all other embodiments acquired under no creative labor by those of ordinary skill in the art fall within the scope of protection of this application.

A solution of an embodiment of the present application is: acquiring first address information of a first earphone, acquiring second address information of a second earphone through the first earphone, the first earphone being wirelessly connected with the second earphone; sending a first upgrade packet to the first earphone based on the first address information to upgrade the first earphone, and meanwhile, sending a second upgrade packet to the second earphone based on the second address information to upgrade the second earphone.

In the related art, when upgrading wireless earphones such as TWS earphones, a left earphone and a right earphone need to be upgraded one after another, therefore the efficiency is low.

The present application provides the above solution, aiming at improving the efficiency of earphone upgrade.

The present application provides an upgrade device 1, which may be applied to program upgrading of wireless earphones. In this embodiment, the wireless earphones refer to a pair of true wireless stereo earphones (TWS earphones for short). In other embodiments, the upgrade device 1 may further be applied to upgrade other types of wireless earphones.

Specifically, any device installed with a preset application may be defined as the upgrade device 1, such as a mobile phones, a computer or the like with the preset application installed. The preset application here refers to the application including an earphone program upgrade function.

Figure 1:
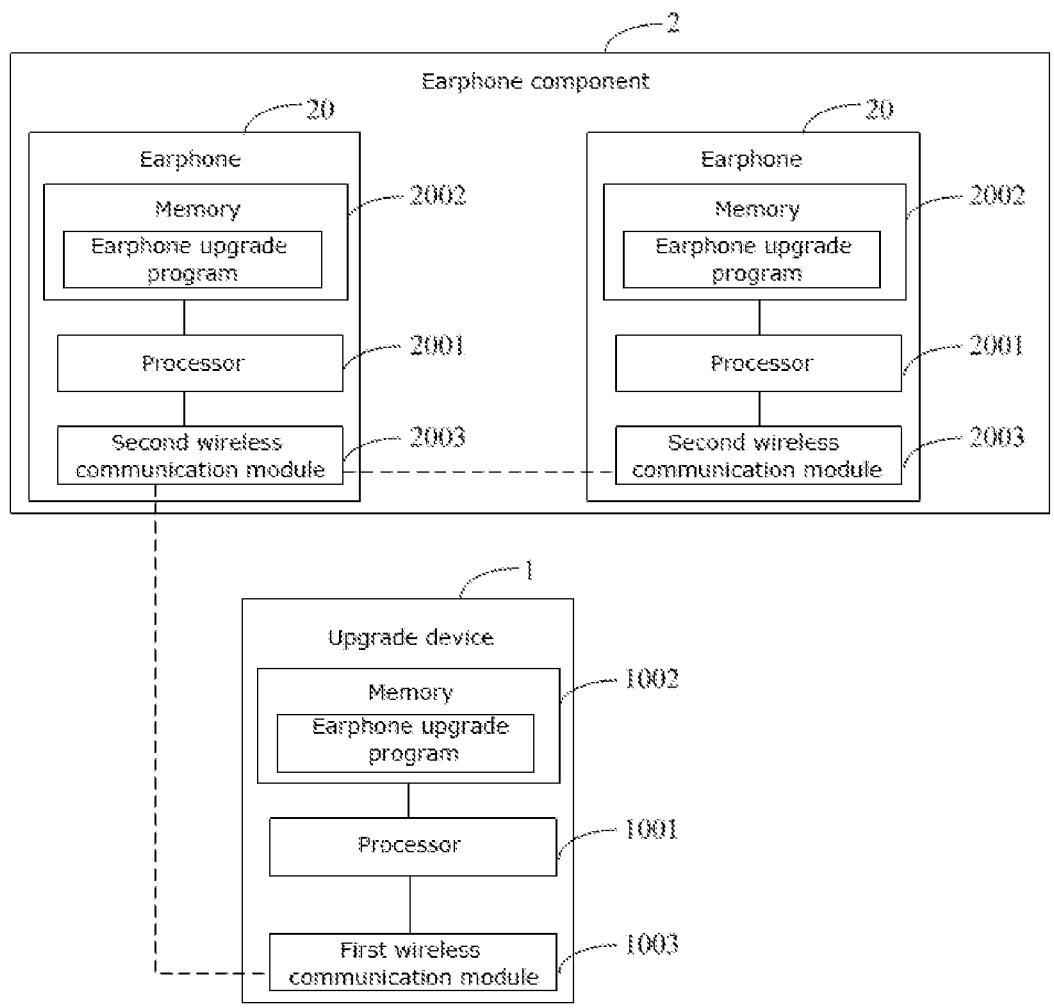
FIG. 1 is a schematic diagram of a hardware structure related to operation of an upgrade device and an earphone assembly according to an embodiment of the present application.

In an embodiment of the present application, according to FIG. 1, the upgrade device 1 includes: a processor 1001 such as a CPU, a memory 1002, a first wireless communication module 1003, and the like. The memory 1002 may be a high-speed RAM memory or a non-volatile memory such as a disk memory. The memory 1002 may optionally be a storage device independent from the processor 1001 described above.

The processor 1001 is in communication with the memory 1002 in which data necessary for upgrading such as an upgrade package may be stored. The processor 1001 may invoke the data in the memory 1002 to upgrade the earphones. The processor 1001 is further connected with a first wireless communication module 1003, and the processor 1001 can be connected with the earphone to be upgraded through the first wireless communication module 1003 to realize an upgrade operation of the earphone. In this embodiment, the first wireless communication module 1003 specifically refers to a bluetooth module. In other embodiments the first wireless communication module 1003 can be another wireless communication module such as a Wi-Fi module according to actual needs.

Those skilled in the art will appreciate that the device configuration shown in FIG. 1 does not constitute a limitation of the device, which may include more or fewer components than illustrated, or a combination of certain components, or different component arrangements.

According to FIG. 1 an earphone upgrade program may be included in the memory 1002 which is a readable storage medium. In the device according to FIG. 1 the processor 1001 can be used to invoke the earphone upgrade program stored in the Memory 1002 and perform related steps of any of a first embodiment to a third embodiment of the following earphone upgrade method.

In addition, an embodiment of the present application further provides an earphone assembly 2 including at least two wireless communication earphones 20. In this embodiment the earphone assembly 2 is specifically TWS earphones and the earphone assembly 2 specifically includes two earphones 20. Each of the earphones 20 includes a processor 2001 such as a CPU, a memory 2002, a first wireless communication module 1003 and the like. The memory 2002 may be a high-speed RAM memory or a non-volatile memory such as a disk memory. The memory 2002 may optionally be a memory device independent from the processor 2001 described above.

The processor 2001 is in communication with the memory 2002 in which data necessary for operation, upgrade and the like of the each earphone 20 can be stored. The processor 2001 can invoke the data in the memory 2002 to control the operation of the earphone 20. The processor 2001 further connects with a second wireless communication module 2003, and therefore realizes a connection between the earphone 20 where the processor 2001 is located with other earphones 20, or realizes a connection between the earphone 20 where the processor 2001 is located with the upgrade device through the second wireless communication module 2003. In this embodiment the second wireless communication module 2003 specifically refers to a Bluetooth module. In other embodiments, the second wireless communication module 2003 can be another wireless communication module such as a Wi-Fi module according to actual needs.

Those skilled in the art will appreciate that the device configuration shown in FIG. 1 does not constitute a limitation of the device and the device can include more or fewer components than illustrated, or a combination of certain components, or different component arrangements.

According to FIG. 1, an earphone upgrade program may be included in the memory 2002 which is a readable storage medium. In the components of FIG. 1, the processor 2001 may be used to invoke the earphone upgrade program stored in the memory 2002 and perform related steps of a fourth embodiment of the earphone upgrade method in the following.

An embodiment of the present application further provides an earphone upgrade method.

Figure 2:
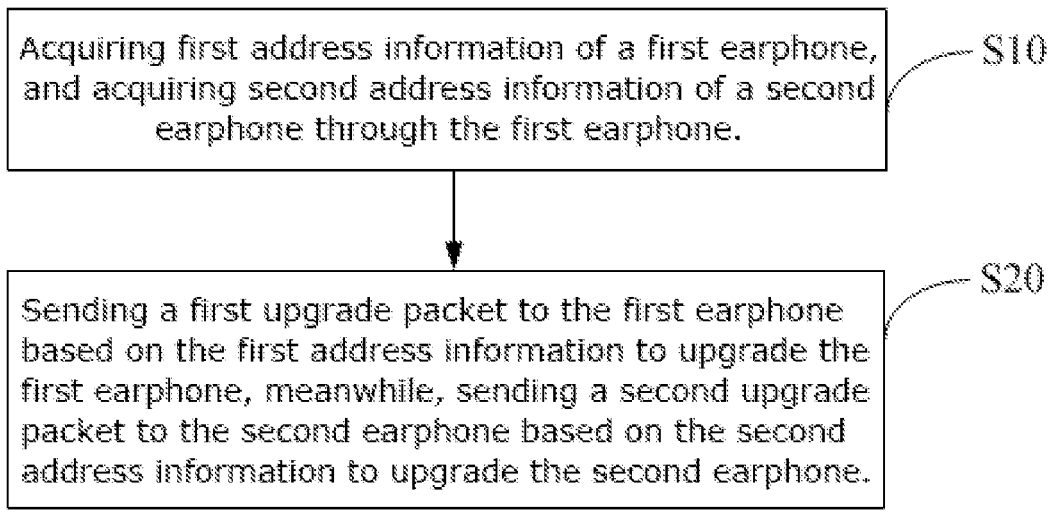
FIG. 2 is a schematic flow diagram of a first embodiment of an earphone upgrade method of the present application.

According to FIG. 2, a first embodiment of the earphone upgrade method of the present application is provided. In the embodiment, an executor of the earphone upgrade method is an upgrade device, and the earphone upgrade method includes:

Step S10, acquiring first address information of a first earphone, and acquiring second address information of a second earphone through the first earphone.

In this embodiment, an earphone assembly includes two earphones, one of which is a first earphone and the other of which is a second earphone. The first earphone is specifically an earphone connected to the upgrade device determined by default settings or preset rules in the earphone assembly. The second earphone is specifically an earphone that does not need to be connected with the upgrade device determined by default setting or preset rules in the earphone assembly. Either of the two earphones can be defined as the first earphone, and another earphone other than the earphone identified as the first earphone can be defined as the second earphone.

Before Step S10, in a determination that a preset instruction is received (for example, a preset key being pressed for a long time is detected), the first earphone and the second earphone are connected through Bluetooth. When the first earphone and the second earphone are connected, wireless communication connection is realized between the upgrade device and the first earphone based on Bluetooth. Specifically, when the first earphone and the second earphone are connected, the Bluetooth of the upgrade device can be turned on to control the upgrade device to scan Bluetooth devices to obtain a device list. When device information (such as a device name, a device number, etc.) of any one of the earphones in the earphone assembly appears in the device list, it indicates that the upgrade device detects the first earphone, and defines the earphone corresponding to the detected device information as the first earphone. The earphone currently connected with the first earphone in wireless communication is defined as the second earphone. It should be noted that in order to ensure sound quality, effective data transmission and other reasons, a connection mode between the two earphones and the upgrade device is a mutual exclusion mode, and the device information of only one of the two earphones is scanned by the upgrade device.

The first earphone is connected with the upgrade device based on Bluetooth, and the first earphone is connected with the second earphone based on Bluetooth to form a local wireless communication environment based on Bluetooth. The first address information is specifically information for distinguishing the first earphone from other devices and realizing connection with other devices in a Bluetooth local wireless communication environment. The second address information is specifically information for distinguishing the second earphone from other devices and realizing connection with other devices in the Bluetooth local area wireless communication environment.

Specifically, the first address information of the first earphone may be acquired by directly scanning the device information of the first earphone by the upgrade device.

The second address information is acquired by reading the device information of the first earphone, or the second address information is directly sent to the upgrade device by the first earphone, therefore the upgrade device acquires the second address information. In addition, in other embodiments, the first address information of the first earphone and the second address information of the second earphone can be associated and stored in the upgrade device. After the upgrade device acquires the first address information, the second address information associated with the first address information can be determined based on stored data, thus the second address information of the second earphone is acquired. The first address information of the first earphone and the second address information of the second earphone may be specifically fixed address information configured for the two earphones in advance, and the second address information of the second earphone may be stored in the first earphone in advance. In addition, the second address information is synchronized from the second earphone to the first earphone, specifically, the second address information of the second earphone may be synchronized by the second earphone to the first earphone when the first earphone and the second earphone are paired. For the second address information is synchronized from the second earphone to the first earphone when the two earphones are paired, even though the address information of the second earphone is changed in a wireless communication environment, the first earphone can also accurately and effectively acquire the second address information, therefor realizing an effective synchronous upgrade of the two earphones.

Step S20, sending a first upgrade packet to the first earphone based on the first address information to upgrade the first earphone, meanwhile, sending a second upgrade packet to the second earphone based on the second address information to upgrade the second earphone.

The upgrade device establishes a first data transmission channel with the first earphone based on the first address information, and the upgrade device can directly send the first upgrade packet to the first earphone through the established first data transmission channel to upgrade the first earphone. At the same time, the upgrade device establishes a second data transmission channel with the second earphone based on the second address information, and the upgrade device can directly send the second upgrade packet to the second earphone through the established second data transmission channel to upgrade the second earphone. The first upgrade package and the second upgrade package are two upgrade data of a same version.

In other embodiments, the upgrade device may not send the upgrade packet directly, but send address information of the upgrade packet to the first earphone and the second earphone, and the two earphones acquire the upgrade packet according to the acquired address information of the upgrade packet.

The embodiment of the present application provides an earphone upgrade method, which includes: acquiring first address information of a first earphone, and acquiring address information of a second earphone through the first earphone, and then updating the two earphones simultaneously based on the address information of the two earphones in the wireless communication environment. In this way, when the first earphone acquires the first upgrade package to upgrade, the second earphone can be connected based on the second address information and a second upgrade package is sent to the second address information to upgrade the second earphone, therefore, the first earphone and the second earphone can be upgraded synchronously, and a time required is shorter than a current mode of upgrading the two earphones one after another, therefore earphone upgrading efficiency is improved. In addition, a master-slave switching and a data transmission are not needed between the two earphones, which simplifies the complexity of an earphone upgrade process, reduces failure probability and improves a success rate of earphone upgrade.

Figure 3:
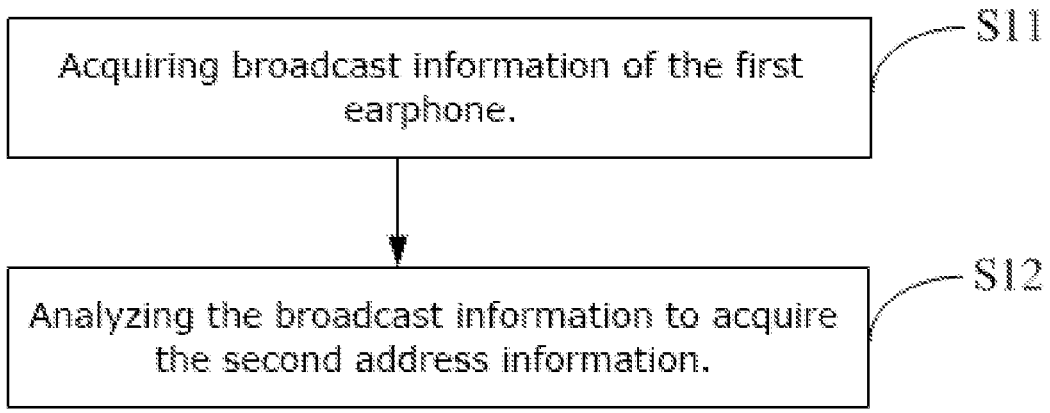
FIG. 3 is a schematic flow diagram of a second embodiment of the earphone upgrade method of the present application.

Further, based on the first embodiment, a second embodiment of the earphone upgrade method of the present application is proposed. In a second embodiment, according to FIG. 3, the step of acquiring second address information of the second earphone through the first earphone includes:

Step S11, acquiring broadcast information of the first earphone;

The first earphone can add the second address information of the second earphone to the broadcast information of the first earphone and start a broadcast. The upgrade device may monitor the broadcast information of the first earphone in real time.

Step S12, analyzing the broadcast information to acquire the second address information.

In this embodiment, the second address information of the second earphone is loaded into the broadcast information of the first earphone. The upgrade device acquires the second address information through the broadcast information. Because even if a device is not connected successfully, the broadcast information can also be effectively detected. Therefore, even if the first earphone is not connected with the upgrade device, the upgrade device can also acquire the second address information of the second earphone from the broadcast information of the first earphone. The second address information is not affected by a connection state of the first earphone, and the second address information may be acquired synchronously during a connection process of the first earphone (an acquisition process of the first address information), thereby effectively reducing a total acquisition time of the first address information and the second address information and further improving efficiency of the earphone upgrade.

Specifically, in the above embodiment, in Step S20, the step of sending a first upgrade packet to the first earphone based on the first address information to upgrade the first earphone includes: invoking a first preset communication interface of the first earphone based on the first address information; creating a first data transmission channel based on the first preset communication interface; and sending the first upgrade package to the first earphone, through the first data transmission channel, therefore the first earphone is upgraded by the first upgrade package. The first preset communication interface is specifically determined according to a communication connection mode between the first earphone and the upgrade device. For example, in this embodiment, the first earphone is connected with the upgrade device through Bluetooth, and the first preset communication interface is specifically a Bluetooth connection interface. Specifically, based on the first address information, the Bluetooth connection interface of the main earphone is invoked, a BluetoothGatt1 object of the first earphone is acquired based on the Bluetooth connection interface, a thread Thread1 is created, and the thread Thread1 is started to send the first upgrade package to the first earphone through a interface sending function BluetoothGatt.writeCharacteristic ( ) of the Bluetooth data of an Android system, and the first earphone carries out a program upgrade on the first earphone after receiving the first upgrade package. In particular, the first upgrade package is upgrade data corresponding to an earphone program of a preset version, and the preset version may be a latest version or a designated version selected according to user's requirements.

Further, in Step S20, the step of sending a second upgrade packet to the second earphone based on the second address information to upgrade the second earphone includes: invoking a second preset communication interface of the second earphone based on the second address information; creating a second data transmission channel based on the second preset communication interface; sending the second upgrade package to the second earphone through the second data transmission channel, therefore the second earphone can be upgraded using the second upgrade package. The second preset communication interface is specifically determined according to a communication connection mode between the second earphone and the upgrade device. For example, in this embodiment, the second earphone is connected with the upgrade device through Bluetooth, and the second preset communication interface is specifically a Bluetooth connection interface. Specifically, based on the second address information, the Bluetooth connection interface of the main earphone is invoked, a BluetoothGatt1 object of the second earphone is acquired based on the Bluetooth connection interface, a thread Thread1 is created, the thread Thread1 is started to send the second upgrade package to the second earphone through a sending interface function BluetoothGatt.writeCharacteristic ( ) of the Bluetooth data of an Android system, and the second earphone carries out a program upgrade on the second earphone after receiving the second upgrade package. In particular, the second upgrade package is upgrade data corresponding to an earphone program of a preset version, and the preset version can be a latest version or a designated version selected according to user's requirements.

In the embodiment, the preset communication interface of the first earphone is invoked based on the first address information to establish the first data transmission channel, therefore, the upgrade device may send the upgrade package to the first earphone through the first data transmission channel to realize an upgrade of the first earphone. At the same time, the second preset communication interface may also be invoked based on the second address information, the second data transmission channel independent of the first data transmission channel is created. Through the second data transmission channel, the upgrade package is sent to the second earphone to upgrade the second earphone. The two data transmission channels are independently created, therefore, transmissions of the upgrade packages do not affect each other, especially the two data transmission channels are both threads, the transmissions of the upgrade packages may be carried out concurrently, and the upgrade device may upgrade the two earphones simultaneously, thereby greatly reducing an upgrade time of the two earphones, improving upgrade efficiency of the wireless earphones (especially the TWS earphones).

Figure 4:
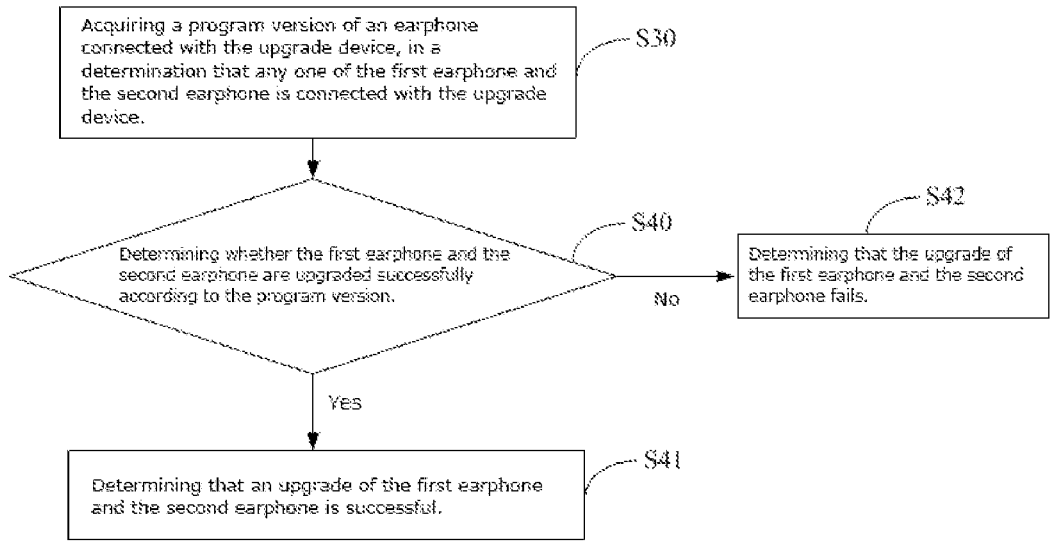
FIG. 4 is a schematic flow diagram of a third embodiment of the earphone upgrade method of the present application.

Further, based on any of the above-mentioned embodiments, a third embodiment of the earphone upgrade method of the present application is proposed. In the third embodiment, according to FIG. 4, after the step S20, the method further includes:

Step S30, acquiring a program version of an earphone connected with the upgrade device, in a determination that any one of the first earphone and the second earphone is connected with the upgrade device.

Specifically, Step S30 is executed, in a determination that the wireless communication connection between the upgrade device and the first earphone or the second earphone is detected, after the wireless communication connection between the upgrade device and the first earphone is disconnected. After the two upgrade packets are respectively sent to the two earphones, it indicates that the upgrade device completes an upgrade of the two earphones. After the upgrade is completed, either the upgrade device or the first earphone can initiate disconnection of the wireless communication connection between the upgrade device and the first earphone. After the connection is disconnected, one of the first earphone and the second earphone can re-initiate a connection with the upgrade device. After restoring of the wireless communication connection between the upgrade device and the first earphone or the second earphone is determined, a program version of the earphone to which the upgrade device is connected can be acquired.

Step S40, determining whether the first earphone and the second earphone are upgraded successfully according to the program version;

executing Step S41, in a determination that the program version is a preset version, or executing step S42, in a determination that the program version is a version other than the preset version.

The preset version here specifically refers to a program version corresponding to the first upgrade package and the second upgrade package. Specifically, the preset version may be the latest version.

Step S41, determining that an upgrade of the first earphone and the second earphone is successful; and Step S42, determining that the upgrade of the first earphone and the second earphone fails.

In particular, in a determination that the upgrade of the first earphone and the second earphone fails, Step S10 can be returned to and executed.

In this embodiment, after the upgrade is completed, the connection between the upgrade device and the earphone component is disconnected and then restores, and the program version of the connected earphone is acquired and compared with the preset version, thereby effectively detecting whether the upgrade of the two earphones is successful or not.

Figure 5:
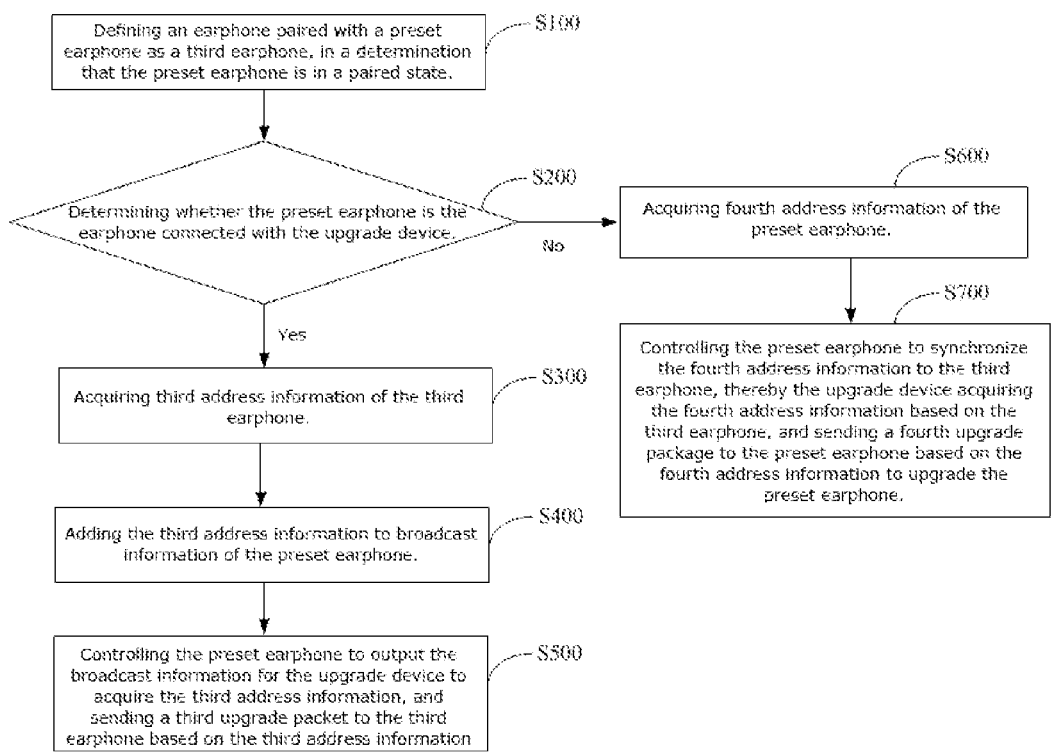
FIG. 5 is a schematic flow diagram of a fourth embodiment of the earphone upgrade method of the present application.

Further, based on any of the above-mentioned embodiments, a fourth embodiment of the earphone upgrade method of the present application is proposed. In the fourth embodiment, an executor of the earphone upgrade method is any of the earphones in the earphone assembly. According to FIG. 5, the earphone upgrade method includes:

Step S100, defining an earphone paired with a preset earphone as a third earphone, in a determination that the preset earphone is in a paired state.

Any of the earphones in the earphone assembly can be defined as the preset earphone here. In a determination that the preset earphone is connected with another earphone through a wireless communication mode such as Bluetooth, the preset earphone is determined to be in a paired state.

Step S200, determining whether the preset earphone is the earphone connected with the upgrade device; and executing Step S300, Step S400 and Step S500 in a determination that the preset earphone is the earphone connected with the upgrade device; or executing Steps S600 and S700 in a determination that the preset earphone is not the earphone connected with the upgrade device.

Specifically, default setting parameters in the preset earphone or a determination result according to a preset rule can be acquired to determine whether the preset earphone is the earphone connected with the upgrade device. It should be noted that the preset earphone is not connected with the upgrade device during the above determination process, and the earphone connected with the upgrade device here does not refer to the earphone currently connecting with the upgrade device, but an earphone whose device information can be effectively detected by the upgrade device.

Step S300, acquiring third address information of the third earphone.

Specifically, reading the third address information directly from a memory of the preset earphone, when the third address information is pre-configured fixed address information and is stored in the preset earphone. In addition, in order to ensure accuracy of the acquired third address information, synchronization information of the third earphone synchronized to the preset earphone can be acquired, and the third address information can be acquired by parsing the synchronization information.

Step S400, adding the third address information to broadcast information of the preset earphone.

The third address information is written into the Bluetooth broadcast information of the preset earphone.

Step S500, controlling the preset earphone to output the broadcast information for the upgrade device to acquire the third address information, and sending a third upgrade packet to the third earphone based on the third address information to upgrade the third earphone.

The Bluetooth broadcast of the preset earphone is started, therefore, the upgrade device may acquire the third address information by detecting the Bluetooth broadcast of the preset earphone, and an upgrade of the third earphone is completed according to a method of any of the above embodiments.

Step S600, acquiring fourth address information of the preset earphone.

Specifically, device operation parameters of the preset earphone can be read, and the fourth address information can be acquired by analyzing the device operation parameters.

Step S700, controlling the preset earphone to synchronize the fourth address information to the third earphone, thereby the upgrade device acquiring the fourth address information based on the third earphone, and sending a fourth upgrade package to the preset earphone based on the fourth address information to upgrade the preset earphone.

Specifically, the preset earphone sends its address information to the third earphone connected with it, therefore the upgrade device may acquire the fourth address information through the third earphone, and the fourth upgrade package is sent to the preset earphone based on the fourth address information to realize an upgrade of the preset earphone.

In this embodiment, in a determination that the preset earphone is connected to the upgrade device, the third address information of the third earphone connected with the third earphone can be broadcast, therefore the upgrade device can not only upgrade the preset earphone, but also acquire the third address information, and send the third upgrade package to the third earphone based on the third address information, to synchronously upgrade the third earphone, thereby improving the upgrade efficiency. In addition, when the preset earphone is defined as an earphone not connected with the upgrade device, the preset earphone synchronizes its own fourth address information to the third earphone, thereby the upgrade device may not only send the third upgrade package to the third earphone for upgrading, but also acquire the fourth address information at the same time and send the fourth upgrade package to the fourth earphone based on the fourth address information, to synchronously upgrade the preset earphone, thereby improving the upgrading efficiency. In addition, the preset earphone can be synchronously upgraded with the third earphone connected with the preset earphone regardless of whether the preset earphone is an earphone connected with the upgrade device, therefore effectively improving the upgrade efficiency of the earphone. In particular, the third upgrade package and the fourth upgrade package are two upgrade data of a same version.

Further, in the fourth embodiment, after the step of upgrading the preset earphone with the upgrade package, the method further includes:

Step S801, controlling the earphone currently connected with the upgrade device to disconnect a communication connection with the upgrade device, after upgrading of the preset earphone and the third earphone is finished;

Step S802, controlling the preset earphone and the third earphone to restart;

Step S803, controlling the preset earphone or the third earphone to connect with the upgrade device, thereby the upgrade device acquires a program version of the earphone connected with the preset earphone, and determines whether the preset earphone and the third earphone are upgraded successfully based on the program version.

In the embodiment, after the preset earphone is controlled to be disconnected from the upgrade device, the preset earphone and the third earphone may realize that the upgrade data are effectively loaded into the earphone, and then the preset earphone or the third earphone is controlled to be reconnected to the upgrade device, therefore the upgrade device can effectively determine whether the two earphones are upgraded successfully.

In addition, an embodiment of the present application further provides a non-transitory computer readable storage medium, in particular, an earphone upgrade program is stored on the non-transitory computer readable storage medium, and when the earphone upgrade program is executed by the processor, the relevant steps of any embodiment of the earphone upgrade method are realized.

Embodiments in this specification are described in a parallel manner or a progressive manner, and each embodiment focuses on differences from other embodiments, and same or similar parts of the embodiments may be referred to each other. As for the devices disclosed in the embodiment, since they corresponds to the methods disclosed in the embodiment, the descriptions thereof are relatively simple and relevant points are described in the method sections.

It will further be appreciated by those of ordinary skill in that art that elements and algorithmic steps of each example described in connection with the embodiments disclosed here may be implemented in an electronic hardware, a computer software, or a combination of both, and a composition and steps of each example have been described functionally generally in the above description in order to clearly illustrate interchangeability of a hardware and a software. Whether the functions are performed in a hardware or a software depends on a specific application and design constraints of the technical scheme. The skilled in the art may use different methods for each particular application to implement the described functionality but such implementation should not be considered outside the scope of the present application.

The steps of the method or the algorithm described in the embodiments disclosed here may be implemented directly in hardware, software modules executed by a processor, or a combination of both. The software modules may be placed in a random access memory (RAM), a memory, a read only memory (ROM), an electric programmable ROM, an electric erasable programmable ROM, a register, a hard disk, a removable disk, a CD-ROM, or any other form of storage medium known in the art.

It should further be noted that relational terms such as first and second etc. are used here only to distinguish one entity or operation from another and do not necessarily require or imply any actual relationship or order between these entities or operations. Moreover, the terms "include", "comprise" or any other variations thereof are intended to encompass non-exclusive inclusion, therefore, a process, a method, an article or an equipment that includes a set of elements includes not only those elements but further other elements that are not explicitly listed or are inherent to such a process, a method, an article or an equipment. In the absence of further limitations, an element defined by the phrase "includes a . . . " does not preclude existence of another identical element in the process, method, article or equipment in which the element is included.

What is claimed is:

1. An earphone upgrade method comprising following steps:
   acquiring first address information of a first earphone, and acquiring second address information of a second earphone through the first earphone; and
   sending a first upgrade packet to the first earphone based on the first address information to upgrade the first earphone, and meanwhile, sending a second upgrade packet to the second earphone based on the second address information to upgrade the second earphone,
   wherein, after the step of sending a first upgrade packet to the first earphone based on the first address information to upgrade the first earphone, and meanwhile, sending a second upgrade packet to the second earphone based on the second address information to upgrade the second earphone, the earphone upgrade method further comprises:
   acquiring a program version of any one of the first earphone and the second earphone connected with the upgrade device;
   determining whether the first earphone and the second earphone are upgraded successfully according to the program version; and
   determining that the first earphone and the second earphone are upgraded successfully, in a determination that the program version is a preset version; or
   determining that an upgrade of the first earphone and the second earphone is failed, in a determination that the program version is a version other than the preset version.

2. The earphone upgrade method according to claim 1, wherein the step of acquiring second address information of a second earphone through the first earphone comprises:
   acquiring broadcast information of the first earphone; and
   analyzing the broadcast information to acquire the second address information.

3. The earphone upgrade method according to claim 2, wherein the second address information is synchronized by the second earphone to the first earphone.

4. The earphone upgrade method according to claim 1, wherein, the step of sending a first upgrade packet to the first earphone based on the first address information to upgrade the first earphone comprises:
   invoking a first preset communication interface of the first earphone based on the first address information;
   creating a first data transmission channel based on the first preset communication interface; and
   sending the first upgrade package to the first earphone through the first data transmission channel, thereby upgrading the first earphone with the first upgrade package.

5. The earphone upgrade method according to claim 4, wherein, the step of sending a second upgrade packet to the second earphone based on the second address information to upgrade the second earphone comprises:
   invoking a second preset communication interface of the second earphone based on the second address information;
   creating a second data transmission channel based on the second preset communication interface; and
   sending the second upgrade package to the second earphone through the second data transmission channel, thereby upgrading the second earphone with the second upgrade package.

6. An upgrade device comprising a memory, a processor, and an earphone upgrade program stored on the memory and operable on the processor, wherein, when the earphone upgrade program is executed by the processor, the steps of upgrading an earphone according to claim 1 are executed.

7. A non-transitory computer readable storage medium storing an earphone upgrade program, wherein the steps of the earphone upgrade method according to claim 1 are executed when the earphone upgrade program is executed by a processor.

* * * * *